United States Patent [19]

Natsume

[11] Patent Number: 5,031,174
[45] Date of Patent: Jul. 9, 1991

[54] NODE DEVICE

[75] Inventor: Akihiro Natsume, Osaka, Japan

[73] Assignee: Sumitomo Electric Industries, Ltd., Japan

[21] Appl. No.: 306,908

[22] Filed: Feb. 7, 1989

[30] Foreign Application Priority Data

Feb. 16, 1988 [JP] Japan .................................. 63-33712

[51] Int. Cl.$^5$ .............................................. H04J 3/02
[52] U.S. Cl. .................. 370/85.5; 370/85.14
[58] Field of Search ................... 370/85.4, 85.5, 85.13, 370/85.14, 85.15; 340/825.05, 825.5, 825.51

[56] References Cited

U.S. PATENT DOCUMENTS

| 4,539,679 | 9/1985 | Bux et al. ........................ 370/85.14 |
| 4,597,078 | 6/1986 | Kempf .............................. 370/85.13 |
| 4,627,052 | 12/1986 | Hoare et al. ..................... 370/85.13 |
| 4,737,953 | 4/1988 | Koch et al. ...................... 370/85.13 |

Primary Examiner—Douglas W. Olms
Assistant Examiner—Wellington Chin
Attorney, Agent, or Firm—Beveridge, DeGrandi & Weilacher

[57] ABSTRACT

This invention relates to a node device which, in the case of a plurality of different types of networks are connected to one another, is able to relay and transmit a packet from a conventional type (e.g., ethernet) LAN to a FDDI LAN. The node device has a MAC sublayer for supporting the conventional LAN and a FDDI MAC sublayer for supporting the FDDI LAN. The FDDI MAC sublayer has a queue provided by a FIFO memory, a transmitting/receiving unit for transmitting, receiving and erasing a packet and a comparator. When a packet issued from a node of the conventional LAN is transmitted to the FDDI LAN via the node device, the queue stores the source address of the packet by a FIFO method. When the transmitting/receiving unit receives a packet, it compares in the comparator the source address of the received packet with the source address read from the queue. When the comparator finds the source addresses are the same each as other, the transmitting/receiving unit erases the packet without relaying and brings the source addresses in the queue up to date. In this way, a packet issued from a node of the conventional LAN is transmitted to the FDDI LAN with the address of the node of the conventional LAN. In this case, the address is used as a source address and the packet makes one round trip on the ring of the FDDI LAN to be erased in the node device.

10 Claims, 4 Drawing Sheets

NODE DEVICE

BACKGROUND OF THE INVENTION

1. Field of the Invention

This invention relates to a node device for use in the token ring LAN (Local Area Network) of the FDDI (Fiber Distributed Data Interface).

2. Related Background Art

The FDDI token ring LAN is a 100-Mbps (Megabit per second) data rate LAN based on the use of a optical fiber and the LAN is being standardized by ANSI (American National Standards Institution)/X3T9.5. The token ring LAN has the following characteristics. In this LAN, a data path, along which is transmitted a packet of data containing, for example, one or a plurality of frames in one direction, interconnects a plurality of nodes in a ring. Each node obtains a priority of transmitting along the data path by capturing a token rotating along the data path. And each node loses the priority by issuing the token when it finishes transmitting a packet. The node erases the packet when it finds the source address(sender) it receives agrees with its own address, without relaying (hereinafter "relay" means to receive and transmit a packet without erasing.) the packet to a next node.

Recently, a plurality of networks are sometimes connected to one another, and in these cases, when the FDDI LAN is used as it is, the following problems take place.

When a packet come from other network such as ethernet or others is transmitted by a concentrator node to the FDDI LAN, since the packet has a node address of the other network as its source address, the concentrator node of the FDDI LAN has no means for identifying a packet which has made one round trip along the data path ring. Thus, it has been impossible to connect different types of networks to the FDDI LAN as it is.

An object of this invention is to provide a node device which is able to function properly as a node of the FDDI LAN.

Another object of this invention is to provide a node device which, in the case a plurality of network are connected to one another, is able to relay correctly a packet from one network to another.

SUMMARY OF THE INVENTION

The node device for use in the token ring LAN according to this invention, in which a plurality of nodes are interconnected in a ring by a data path along which a packet of data is transmitted in one direction; one of the nodes capturing a token has a priority of transmitting the packet along the data path; when the node finishes transmitting the packet onto the data path, the node releases the token onto the data path, comprises memory means for storing by a FIFO (first in first out) method the source address added to a packet transmitted by the node device with a transmission priority possessed thereby; comparator means for comparing the source address added to a packet received from the data path with a source address read from the memory means by using FIFO method, after the packet has been issued by the node device with the priority possessed thereby, and erasing means for relaying the received packet to a next node along the data path when the comparator means finds that the source address of the received packet and the read source address do not agree with each other, and erasing the received packet, bringing the source addresses in the memory means up to date when the comparator means finds that the two source addresses agree with each other.

Further, the node device for use in the token ring LAN according to this invention, in which a plurality of nodes are interconnected in a ring by a first data path along which a packet of data is transmitted in one direction; one of the nodes capturing a token has a priority of transmitting a packet along the first data path; when the node finishes transmitting a packet onto the first data path, the node releases the token onto the first data path, is connected to a second data path connecting at least one of the nodes and comprises memory means for storing by a FIFO method the source address added to a packet transmitted onto the first data path by the node device with a transmission priority possessed thereby; comparator means for comparing the source address added to a packet received by the node device from the first data path with a source address read from the memory means by the FIFO method, after the packet has been transmitted with the priority possessed by the node device; erasing means for relaying the received packet to a next node along the first data path when the comparator means finds that the source address of the received packet and the read source address do not agree with each other, and erasing the packet, bringing the source addresses in the memory means up to date when the comparator means finds that the two source addresses agree with each other.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
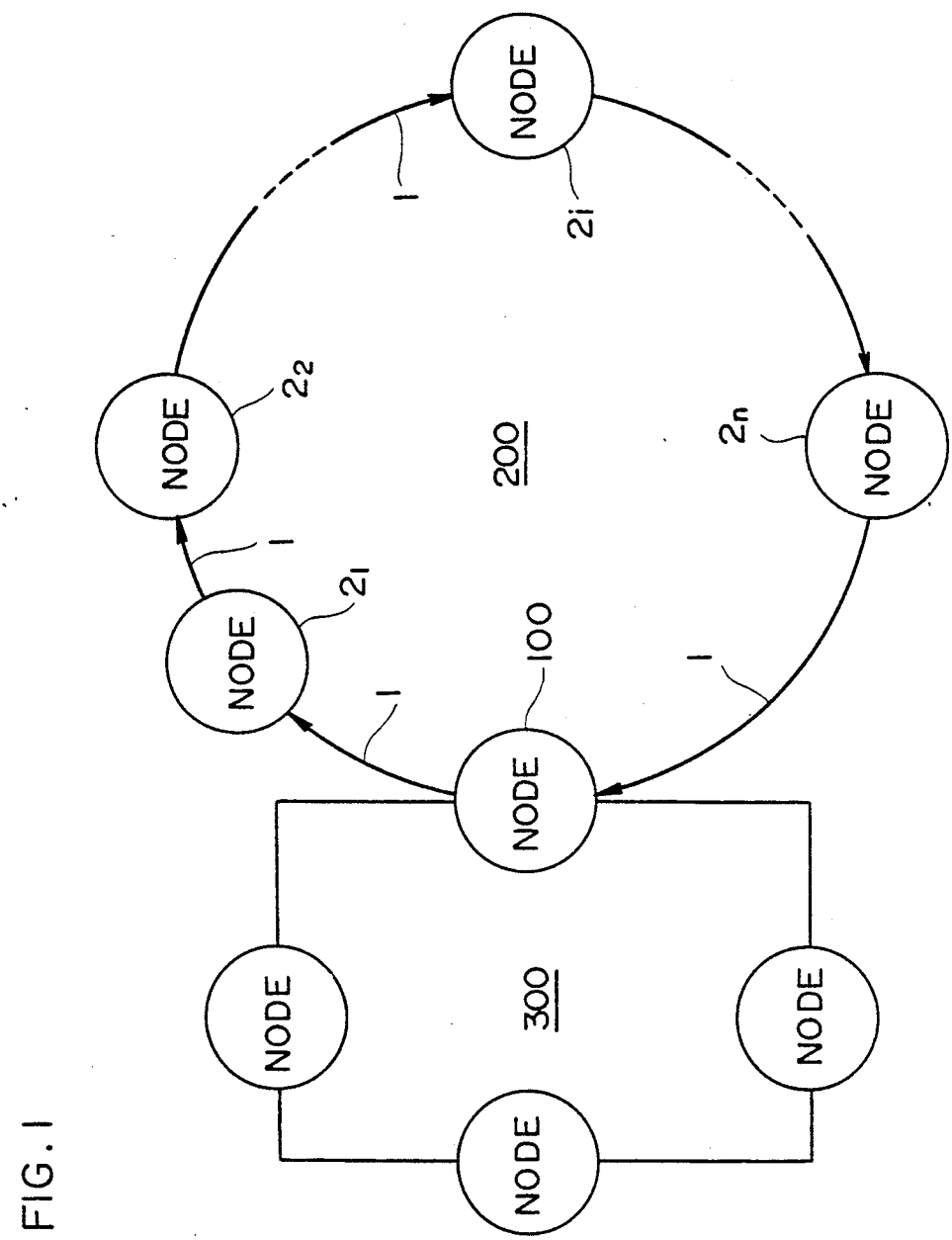
FIG. 1 is a block diagram of a complex LAN using the node device according to one embodiment of this invention.

As shown in FIG. 1, the node device according to this invention provides one node of the FDDI LAN 200 interconnected (n: a natural number) nodes $2_1, 2_2, \ldots, 2_n$ ring by optical fiber, while providing one of nodes of another LAN 300. Whether the LAN 300 is of the FDDI or another type (e.g., ethernet), no problem especially occurs, because the node device 100 has a function of taking out differences in specifications between the FDDI LAN 200 and the LAN 300. The nodes $2_1, 2_2, \ldots 2_n$ perform the FDDI transmission.

Figure 2:
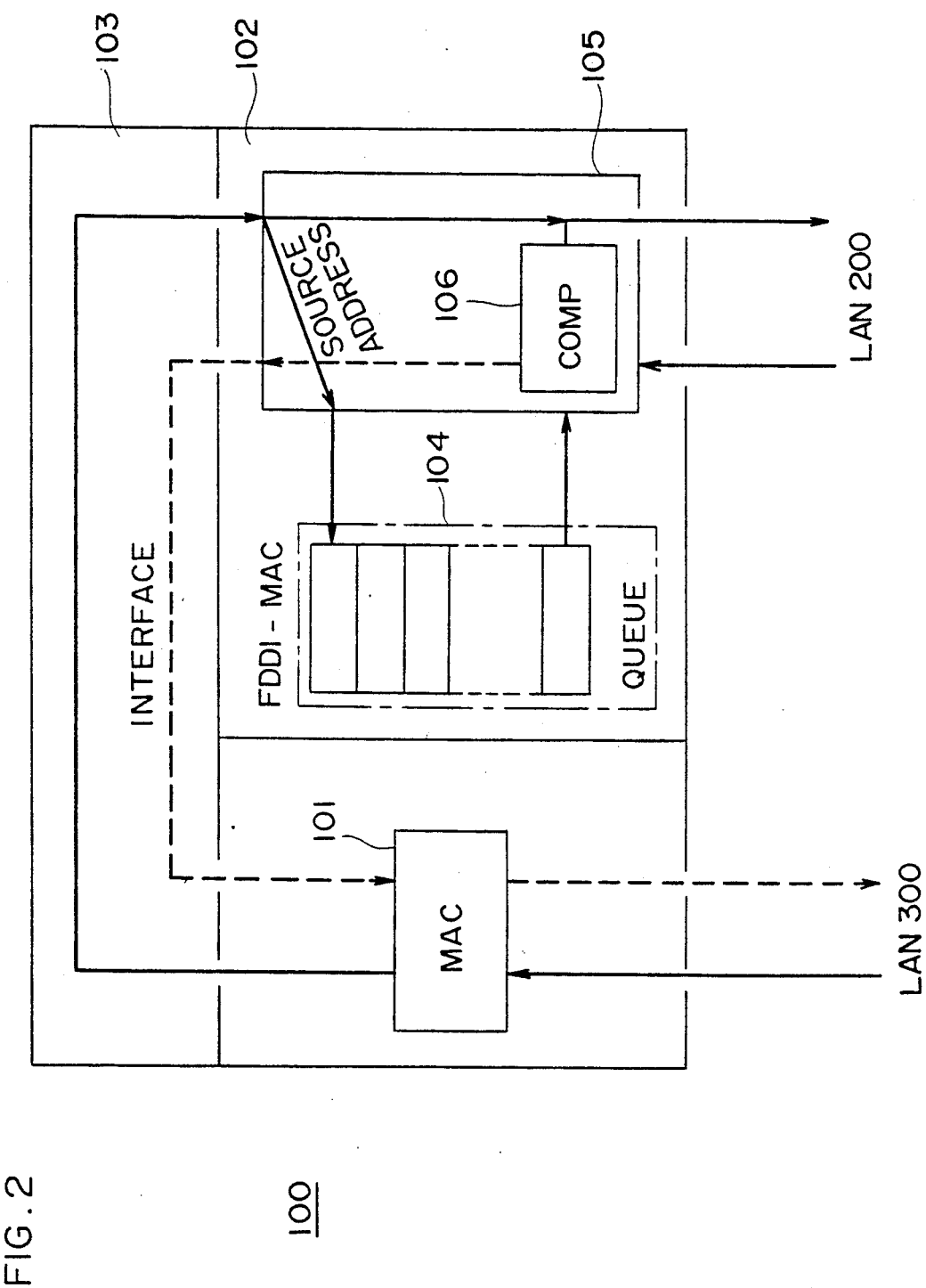
FIG. 2 is a block diagram of the node device according to, a first embodiment of this invention.

As shown in FIG. 2, the node device according to a first embodiment of this invention has a MAC (media access control) sublayer 101 for supporting the LAN 300, a FDDI MAC sublayer (hereinafter called FDDI MAC) 102 for supporting the FDDI LAN 200, and an interface 103 for taking out specifications differences between the sublayers 101 and 102. The node device 100 includes, in addition to the above described sublayers, an upper layer of a logical link control (LLC) corresponding to the respective LANs, a physical layer, an interface connector, etc., which are not shoWn, but they are not explained here, because they are not pertinent directly to this invention.

The FDDI MAC 102 has a queue 104 provided by a FIFO memory, a shift register, or others, and a transmitting/receiving unit 105 for transmitting, receiving and erasing a packet. The transmitting/receiving unit 105 has a comparator 106. When a packet from the LAN 300 reaches the interface 103 via the MAC 101, and the interface 103 supplies a data transmission request to the transmitting/receiving unit 105, the unit 105 starts to capture a token rotating on the ring of the LAN 200. When the transmitting/receiving unit 105 captures the token, it receives a packet of data stored in the interface 103, detects the source address of the packet, stores the source address in the queue 104, and transmits the packet to a next node $2_1$ of the LAN 200. When the transmitting/receiving unit 105 repeats this operation every time it receives a data transmission request from the interface 103 and is supplied with a packet, the queue 104 stores the source address of the packet transmitted first. The queue 104 stores the source address in the sequential order of the arrival of the source address.

On the other hand, the transmitting/receiving unit 105 extracts the source address of a packet supplied by the node $2_n$ of the LAN 200 and compares in the comparator 106 the extracted source address with the source address stored firstly in the queue 104. When the comparator 106 finds that the extracted source address is the same as the source address stored firstly, which means that the packet has been transmitted by the node device 100, the transmitting/receiving unit 105 erases the packet without relaying the packet to the next node $2_1$. When the extracted source address does not agree with the source address stored firstly, the transmitting/receiving unit 105 supplies the packet to the next node $2_1$ without erasing the packet. When the packet is erased, the source address stored firstly in the queue 104 is erased, the source address stored secondly therein comes up to the place of the source address stored firstly, ready for a next packet.

The relay of a packet of data from the LAN 200 to the LAN 300 is indicated by the broken line in FIG. 2 without its detailed description, because it is not pertinent directly to this invention In this first embodiment, the node device 100 only relays a packet of data from the LAN 300 to the LAN 200 but does not issue its own data transmission request.

The operation of the node device 100 according to the first embodiment will be explained below. When a packet issued from on of the nodes of the LAN 300 is stored in the interface 103, (on which stage the packet is made adaptable to the FDDI LAN as described above), a data transmission request is supplied to the FDDI MAC 102. In response to the request, the transmitting/receiving unit 105 starts to capture the token rotating on the ring of the LAN 200, and when it captures the token, it possesses a transmission priority as long as it retains the token. Next, in the FDDI MAC 102, the transmitting/receiving unit 105 receives the packet from the interface 103, and extracts the source address of the packet and stores the source address in the queue 104 by FIFO method. Then the transmitting/receiving unit 105 transmits the packet to the next node $2_1$ of the LN 200.

At the same time, the transmitting/receiving unit 105 of the FDDI MAC 102 receives a packet transmitted thereto by another node of the LAN 200 or relayed by the node $2_n$ of the LAN 200. When the unit 105 receives a packet, it compares in the comparator 106 the source address of the received packet with the source address on the side of the outlet thereof (stored firstly in the queue 104). When the packet is the one that has been transmitted from the node device 100, the source address of the packet agrees with the source address stored firstly in the queue 104. Then, in response to this comparison result, the transmitting/receiving unit 105 erases the packet and brings the source addresses in the queue 104 up to date. While the node device 100 is transmitting packets, possessing a transmission priority, the comparison results show that the source addresses of the packets received by the node device 100 agree with the source addresses coming up sequentially from nearest the outlet of the queue 104, and the packets are erased one after another, and the source addresses in the queue 104 are brought up to date.

The other nodes $2_1, 2_2, \ldots 2_n$ relay (including copy) a packet to their next nodes when they receive the packet. But when the packet has the same source address as their own, they erase the packet. This prevents the packet issued from one of the other nodes $2_1, 2_2, \ldots 2_n$ from arriving at the node device 100 while the node device 100 has a transmission priority.

When the transmitting/receiving unit 105 of the FDDI MAC 102 releases the token onto the ring of the LAN 200 when it has transmitted all the packets, the FDDI MAC 102 starts the operation of relaying packets on the LAN 200. In this way, a packet issued from a node of the LAN 300 is transmitted on the LAN 200 with the address of the node of the LAN 300 used as a source address and makes one round trip on the ring of the LAN 200 to be erased in the node device 100. A packet transmitted from the LAN 300 can be correctly transmitted on the FDDI LAN 200.

Figure 3:
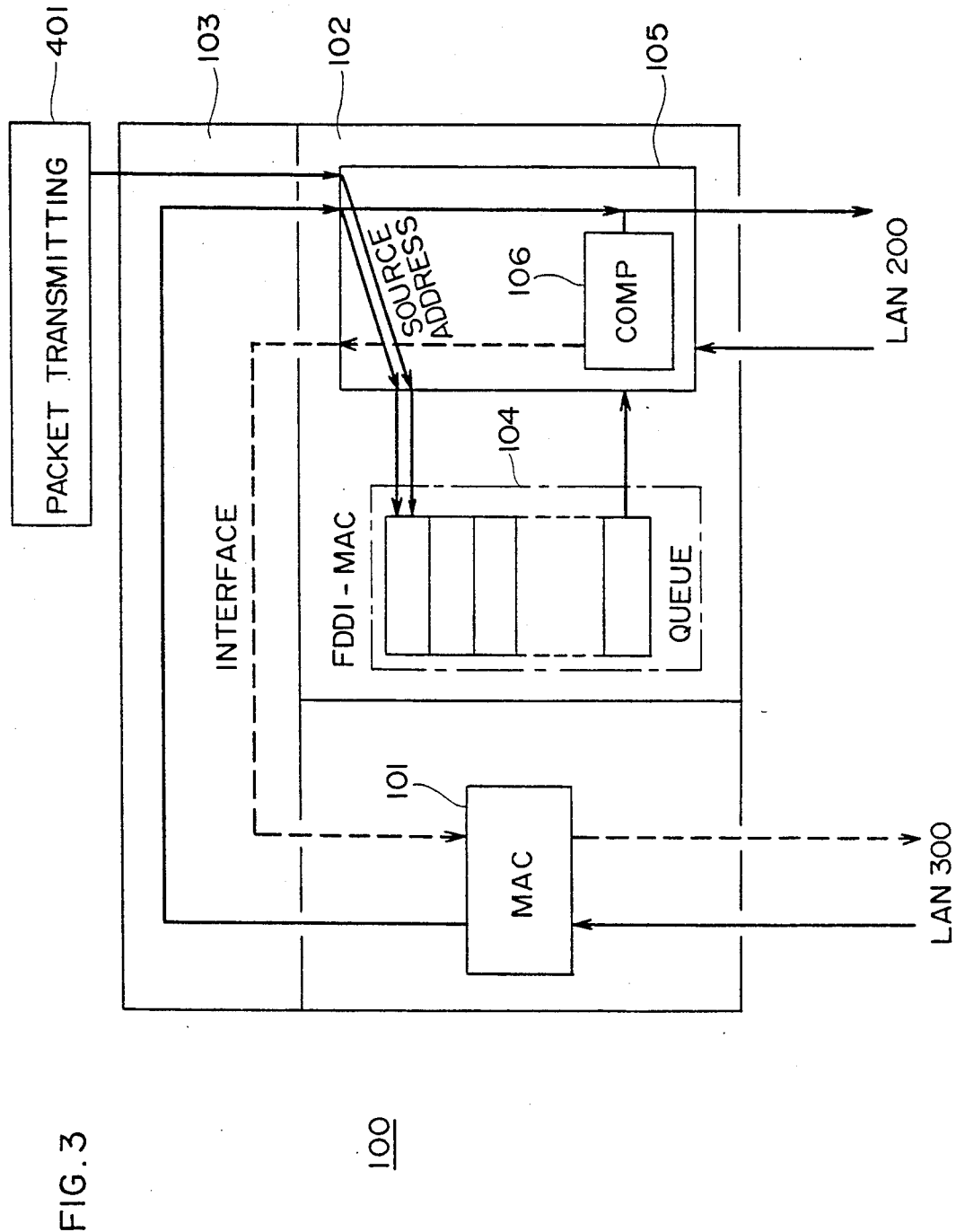
FIG. 3 is a block diagram of the node device according to a second embodiment of this invention.

The node device 100 according to a second embodiment of this invention differs from that according to the first embodiment in that in the former the node device 100 itself issues a packet. As shown in FIG. 3, the node device 100 includes a packet transmitting unit 401 for transmitting a packet of its own. When the node device 100 obtains a priority of transmitting on the LAN 200, capturing the token, its own packet from the packet transmitting unit 401 iS transmitted to a next node 21 of the LAN 200 via the transmitting/receiving unit 105. At this time, the source address of the packet is extracted in the transmitting/receiving unit 105 and stored in the queue 104. Accordingly, the queue 104 stores the source address of a packet issued from a node of the LAN 300 and transmitted by the node device 100 onto the ring of the LAN 200, and the source address of the packet issued from the node device 100 itself, in the sequential order of the arrival of the packets at the node device 100 (FIFO). A packet which has been issued from the node device 100 and made one round trip on the ring of the LAN 200 is erased in the node device 100 without being relayed any further.

Figure 4:
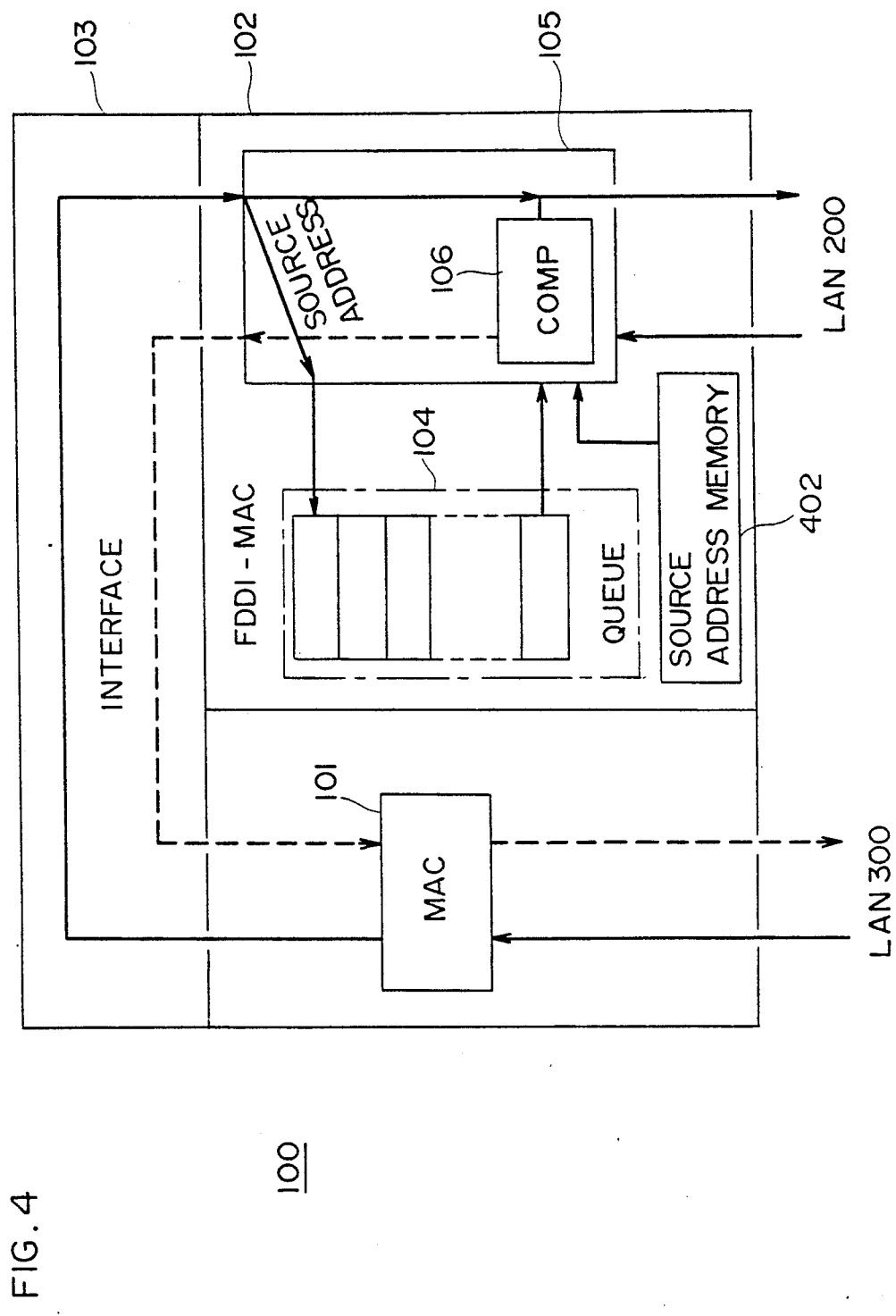
FIG. 4 is a block diagram of the node device according to a third embodiment of this invention.

In the node device 100 according to a third embodiment, the node device can issue its own packet. As shown in FIG. 4, the node device 100 further includes a source address memory 402 for storing the source address of its own packet. The source address stored in the memory 402 is supplied to the comparator 106. When a packet is relayed from the LAN 300 onto the LAN 200 via the node device 100, the source address of the packet is stored in the queue 104. On the other hand when the node device 100 issues its own packet onto the LAN 200, the source address of the packet is stored in the source address memory 402. When the packet comes back to the node device 100 after one round trip on the ring of the LAN 200, the source address of the packet is compared first of all with a source address stored in the source address memory 402. If the former source address agrees with the latter one, the packet is erased. Contrary to this, when the former source address does not agree with the latter one, the former source address is compared by the comparator 106 with the first source address on the side of the output of the queue 104. If the former source address agrees with the first source address, the packet is erased. Unless they agree with each other, the packet is relayed to a next node $2_1$ of the LAN 200.

In the first to the third embodiments, the source addresses of the LAN 300 are usable on the LAN 200. But it is possible to add the source address of, e.g., the node device 100 to the source address of a packet issued from a node of the LAN 300 and relay the packet onto the LAN 200 with the addition as a new source address. In this case, the node device 100 further includes a circuit, or software for generating a source address, and a circuit or software for adding the newly generated source address to the source address of a packet transmitted from the LAN 300.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A node device for use in a token LAN wherein a plurality of node devices are interconnected in a ring by a data path, along which packet data, including a source address which indicates a node device transmitting the packet data, are transmitted in one direction, wherein when one of the node devices captures a token, said one node device obtains priority for transmitting packet data along the data path, and wherein when said one node device finishes transmitting of packet onto the data path, said one node device releases the token onto the data path, the node device for use in the token LAN being interconnectable in the ring by the data path and comprising:

memory means for storing in FIFO order, a source address of packet data which is transmitted by the node device when the node device possesses transmission priority;

comparator means for comparing the source address of packet data received from the data path with a source address read out from the memory means in FIFO order; and means for relaying the received packet data to another node device along the data path when the comparator means determines that the source address of the received packet data and the source address read out from the memory means according to FIFO order do not agree with each other, and for erasing the received packet data and the compared source address in the memory means to update the memory means when the comparator means determines that the source address of the received packet data and the source address read out from the memory agree with each other.

2. A node device according to claim 1, wherein the memory means is provided by a queue means comprising a shift register.

3. A node device according to claim 1, wherein the memory means is provided by a queue means comprising a RAM.

4. A node device for use in a token LAN wherein a plurality of node devices are interconnected in a ring by a first data path along which packet data, including a source address which indicates a node device transmitting the packet data, are transmitted in one direction, wherein when one of the node devices captures a token, said one node device obtains priority for transmitting packet data along the data path; and wherein when said one node device finishes transmitting of packet data onto the data path, said one node device releases the token onto the first data path, the node device for use in the token LAN being interconnectable in the ring by the first data path and comprising:

terminal means for connecting the node device with a second data path by which the node device is also interconnected in another ring along which packet data are transmitted in one direction;

memory means for storing in FIFO order, the source address of packet data transmitted onto the first data path by any node device interconnected in the first data path and possessing transmission priority therein;

comparing means which, after its node device transmits packet data while possessing priority, compares the source address of packet data received from the first data path with a source address read from the memory means in FIFO order; and means for relaying the received packet data to another node device along the first data path when the comparator means determines that the source address of the received packet data and the source address read out by the memory means according to FIFO order do not agree with each other, and for erasing the received packet data and the compared source address in the memory means to update the memory means when the comparator means determines that the source address of the received packet data and the source address read out from the memory agree with each other.

5. A node device according to claim 4, wherein the memory means is provided by a queue means comprising a shift register.

6. A node device according to claim 4, wherein the memory means is provided by a queue means comprising a RAM.

7. A node device according to claim 4, wherein the memory means stores at least a source address of packet data received from the second data path and transmitted along the first data path.

8. A node device according to claim 4, wherein the memory means stores source addresses of packet data received from the second data path and transmitted onto the first data path, and source addresses of packet data issued by the node device itself onto the first data path.

9. A node device according to claim 3, wherein the memory means stores data including at least the source address of the received packet data.

10. A node device according to claim 3 wherein the memory means comprises a first memory for storing in FIFO order a source address of packet data received from the second data path and transmitted onto the first data path, and a second memory for storing a source address of packet data issued by the node device itself onto the first data path;

and wherein the comparator means compares the source address of packet data received from the first data path with the source addresses read-out from the first and second memories in FIFO order to determine whether the source address of the packet data received from the first data path is identical to the source addresses read-out from the first and second memories.

* * * * *